US005172975A

United States Patent [19]

Parker

[11] Patent Number: 5,172,975

[45] Date of Patent: Dec. 22, 1992

[54] LIGHT ASSEMBLY WITH VENTILATED HOUSING

[75] Inventor: Warren K. Parker, Hollywood, Calif.

[73] Assignee: Mole-Richardson Co., Hollywood, Calif.

[21] Appl. No.: 874,416

[22] Filed: Apr. 27, 1992

[51] Int. Cl.[5] .............................................. B60Q 1/06

[52] U.S. Cl. .................................... 362/373; 362/294; 362/264

[58] Field of Search ............... 362/294, 291, 290, 264, 362/345, 373

[56] References Cited

U.S. PATENT DOCUMENTS

| | | | |
|---|---|---|---|
| D. 204,796 | 5/1966 | Harrison et al. | D48/20 |
| D. 260,300 | 8/1981 | Aron | D26/63 |
| D. 276,559 | 11/1984 | Krokaugger | D26/63 |
| D. 286,578 | 11/1986 | Krokaugger | D26/63 |
| 2,287,328 | 6/1942 | Rose | 362/373 |
| 5,091,835 | 2/1992 | Malek et al. | 362/373 X |

*Primary Examiner*—Stephen F. Husar
*Attorney, Agent, or Firm*—Edward A. Sokolski

[57] ABSTRACT

A light assembly has a light unit mounted within a housing having a front portion with a lens for passing light from the light unit, a side portion with ventilation channels formed therein and a rear portion which completes the enclosure of the light unit. The ventilation channels in the housing side portion are formed by a plurality of fins formed by strip sections which are spaced from each and which have lips running along the inner edges thereof which extend at an obtuse angle relative thereto. The fins are joined together to form an integral unit with the channels running completely around the housing. The channels formed between the fins permit a free flow of air for ventilating the interior of the housing. The fins are angled away from the center of the housing so that along with the lips running along their inner edges such fins operate to minimize the passage of light through the housing side portion.

9 Claims, 6 Drawing Sheets

LIGHT ASSEMBLY WITH VENTILATED HOUSING

BACKGROUND OF THE INVENTION

1. Field of the Invention

This invention relates to light assemblies and more particularly to a high power light which can be used as a spot light, flood light, or the like.

2. Description of the Related Art

Spot lights and flood lights are commonly used in motion picture, television and theater work. Such lights are generally of high power and generate considerable heat. Thus, good ventilation is essential to avoid a fire hazard, damage to the equipment or burn injuries to operating personnel. In order to provide efficient use of the light energy generated by the light unit, it is important that the housing permit a minimum amount of light to inadvertently escape from such housing(i.e. except from the light emitting lens of the equipment). This presents a distinct ventillation problem.

Most prior art high power light assemblies have apertures or slots which are located in the front, rear and sometimes the side walls of the light unit housing. Typical prior art units of this type are shown in U.S. Pat. Nos. 204,796, 260,300, 276,559, and 286,578. Such prior art units to some degree or the other sacrifice ventillation in the interests of minimizing the escape of light from the housing.

SUMMARY OF THE INVENTION

The present invention obviates the aforementioned problems encountered with prior art light unit ventillation systems by utilizing a plurality of spaced apart fins in the form of endless strip sections for forming the side portion of the light assembly housing. The fins are joined together to form an integral unit with spaces therebetween which form ventilation channels for ventilating the interior of the housing. In the preferred embodiment the housing is cylindrical with the strip sections forming the fins being conical but other curved or straight line shapes can be used to equal advantage in carrying out the invention.

To minimize the loss of light from the interior of the housing, the fins which extend towards the interior of the housing are angulated away from the center of such housing and have lips extending from the edges thereof at an obtuse angle relative to the main body of the fins.

A light unit, which may have a reflecting mirror is contained within the housing. The front wall portion of the housing has a lens installed therein through which the beam of light is passed, the housing being completed by a rear wall portion substantially opaque to light which is located directly opposite the front wall portion.

It is therefore an object of this invention to facilitate the ventilation of a high power light unit without sacrificing the lighting efficiency thereof;

Other objects of the invention will become apparent from the following description in connection with the accompanying drawings.

DETAILED DESCRIPTION OF THE INVENTION

Figure 4:
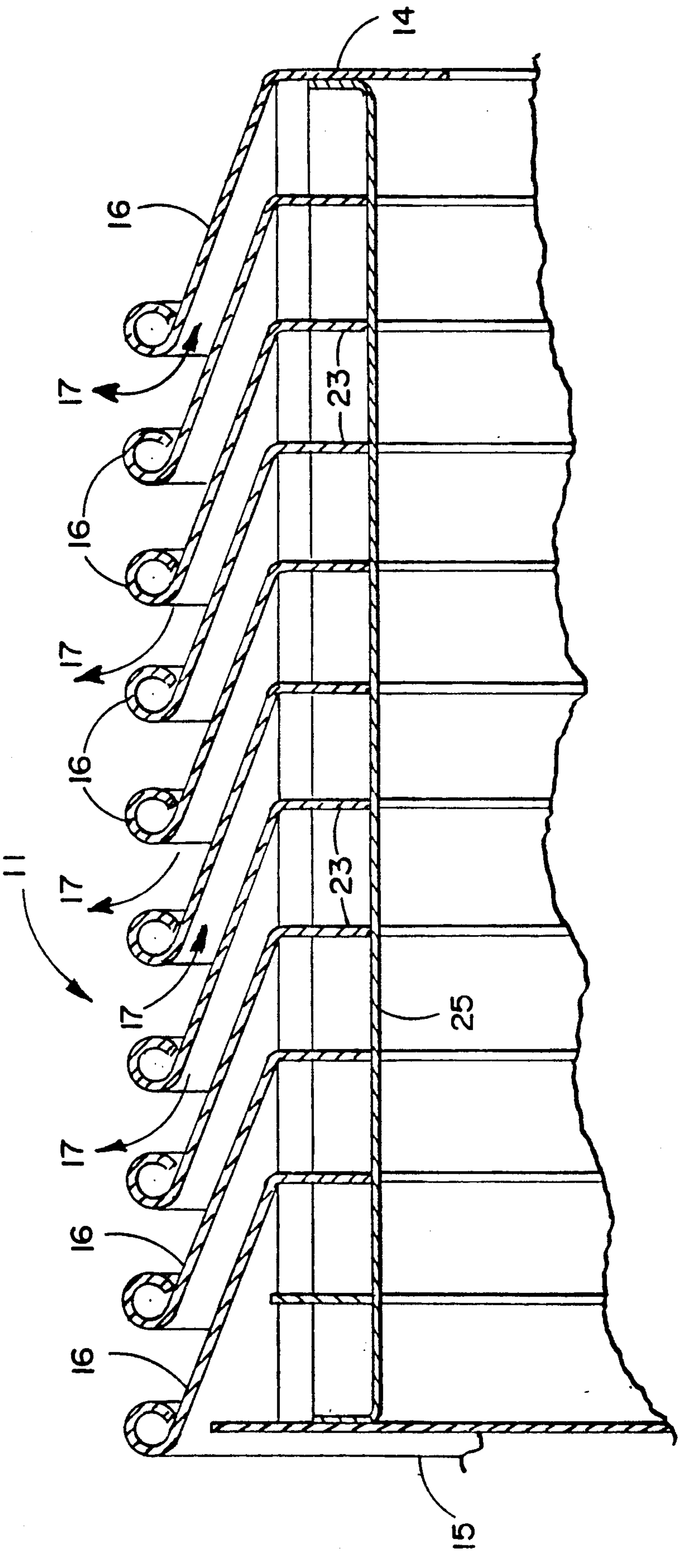
FIG. 4 is an enlarged fragmentary sectional view illustrating the strip sections of the preferred embodiment in their integrally assembled form.

Referring to FIGS. 1–4, 6 and 6A the housing of the preferred embodiment of the invention is illustrated. Housing 11 has a a cylindrical side wall portion 12, a circular front wall portion 14 and a circular rear wall portion 15. Side wall portion 12 is constructed from a plurality of endless strip sections forming conical fins 16 which are spaced from each other and which run towards the interior of the housing. As shown in FIG. 4, channels 17 are formed between the fins to permit the circulation of air between the ambient atmosphere surrounding the housing and the interior of such housing.

Figure 1:
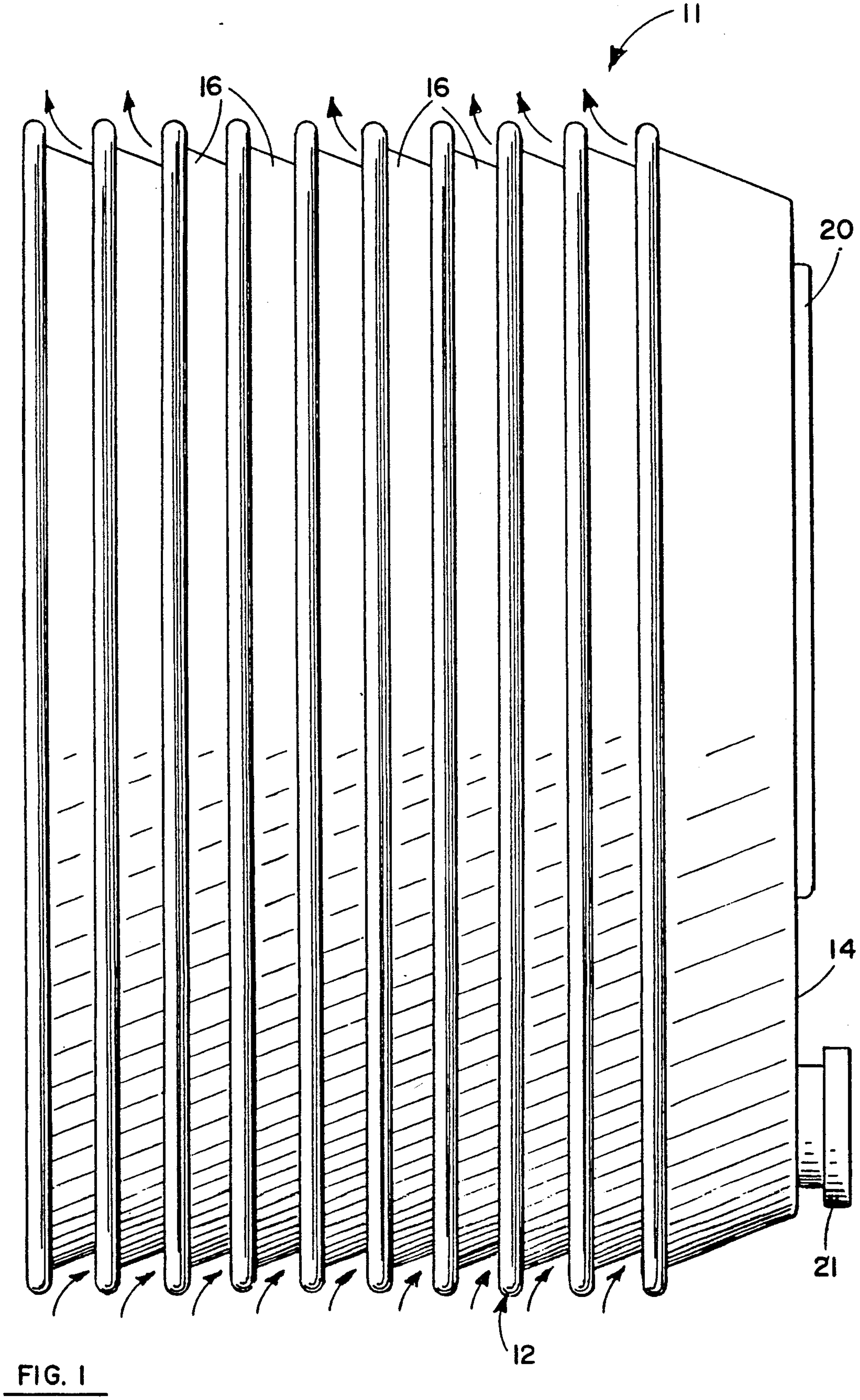
FIG. 1 is a side elevational view of a preferred embodiment of the invention.
Figure 2:
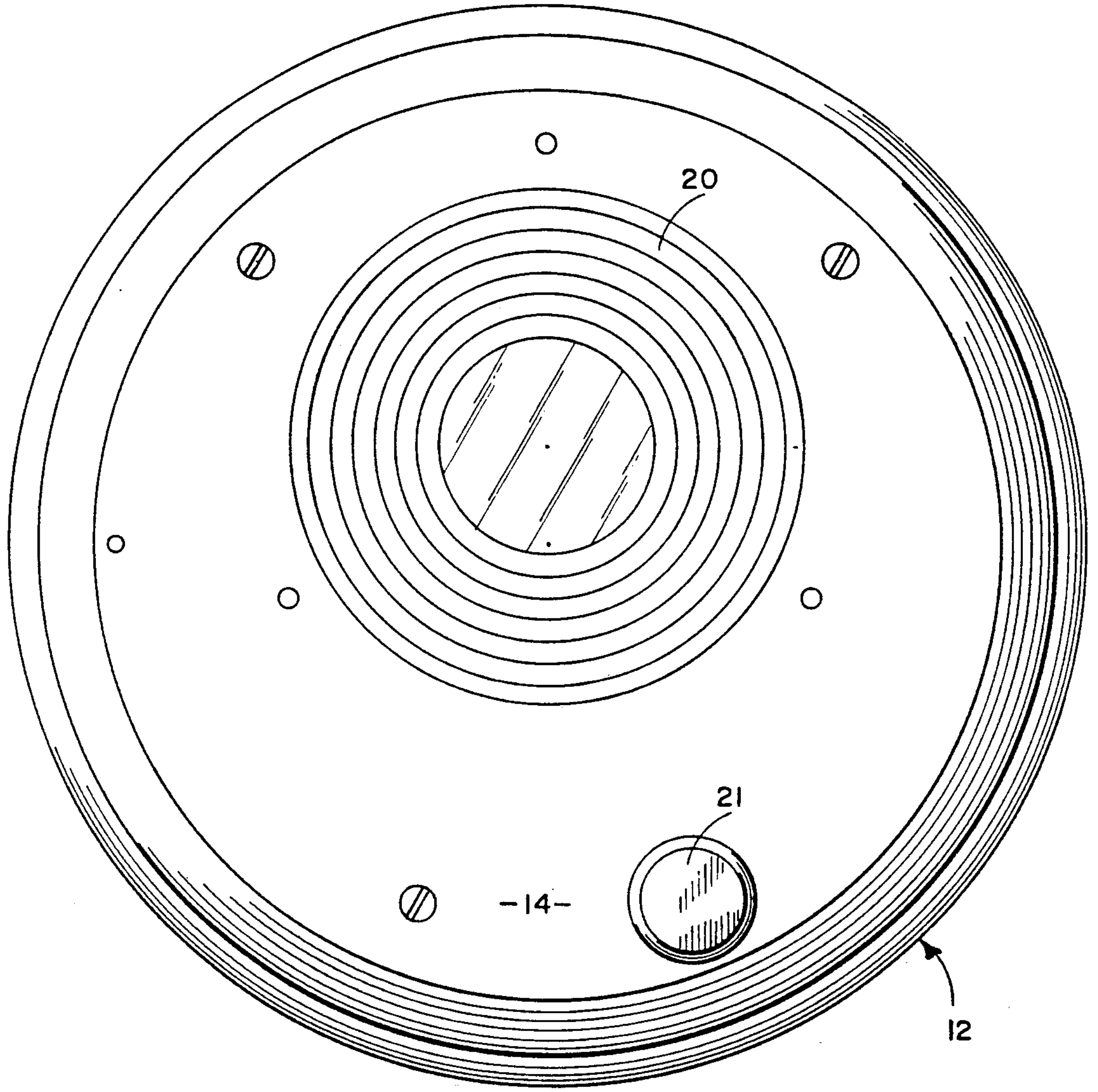
FIG. 2 is a front elevational view of the preferred embodiment.
Figure 3:
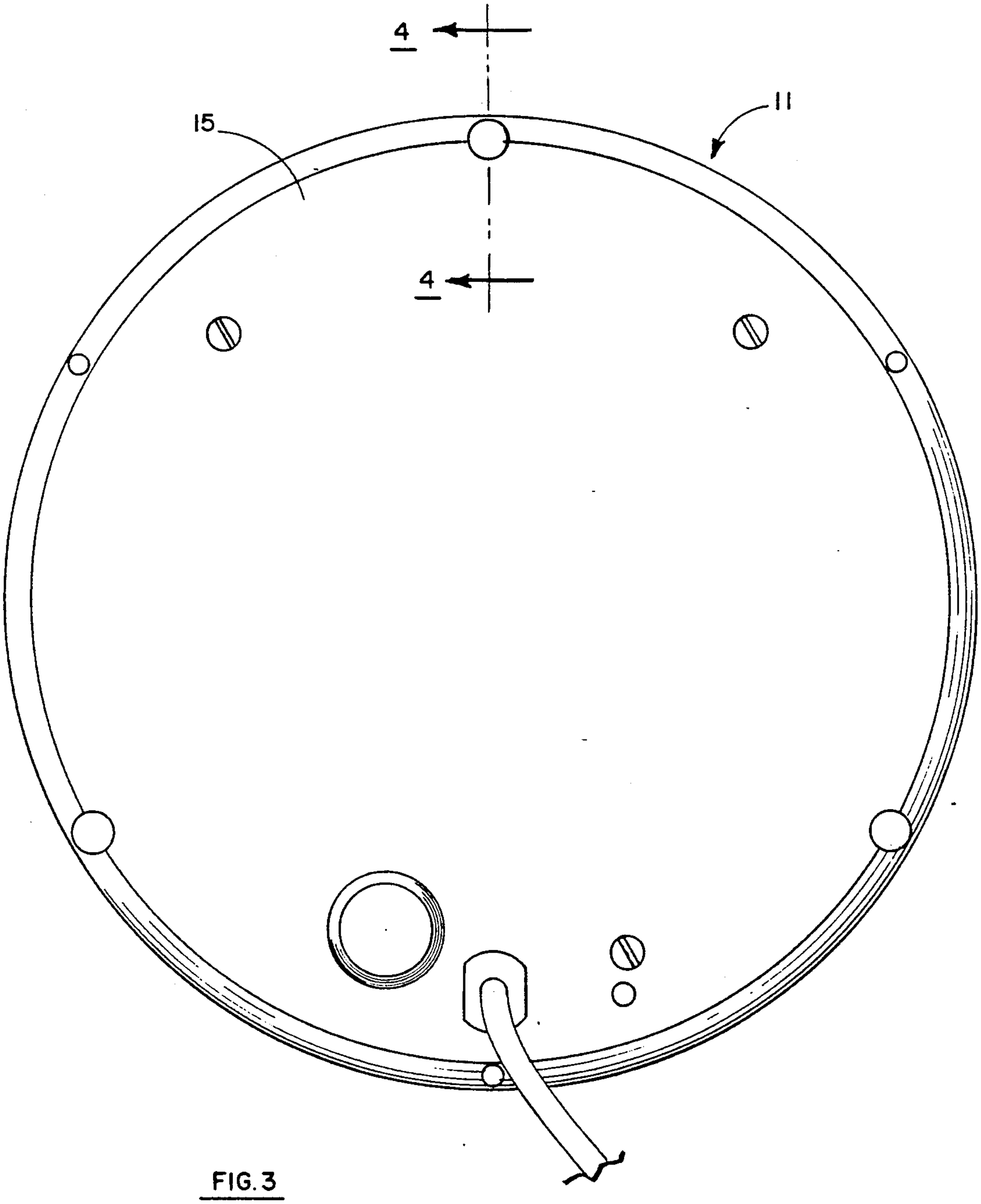
FIG. 3 is a rear elevational view of the preferred embodiment.
Figure 5:
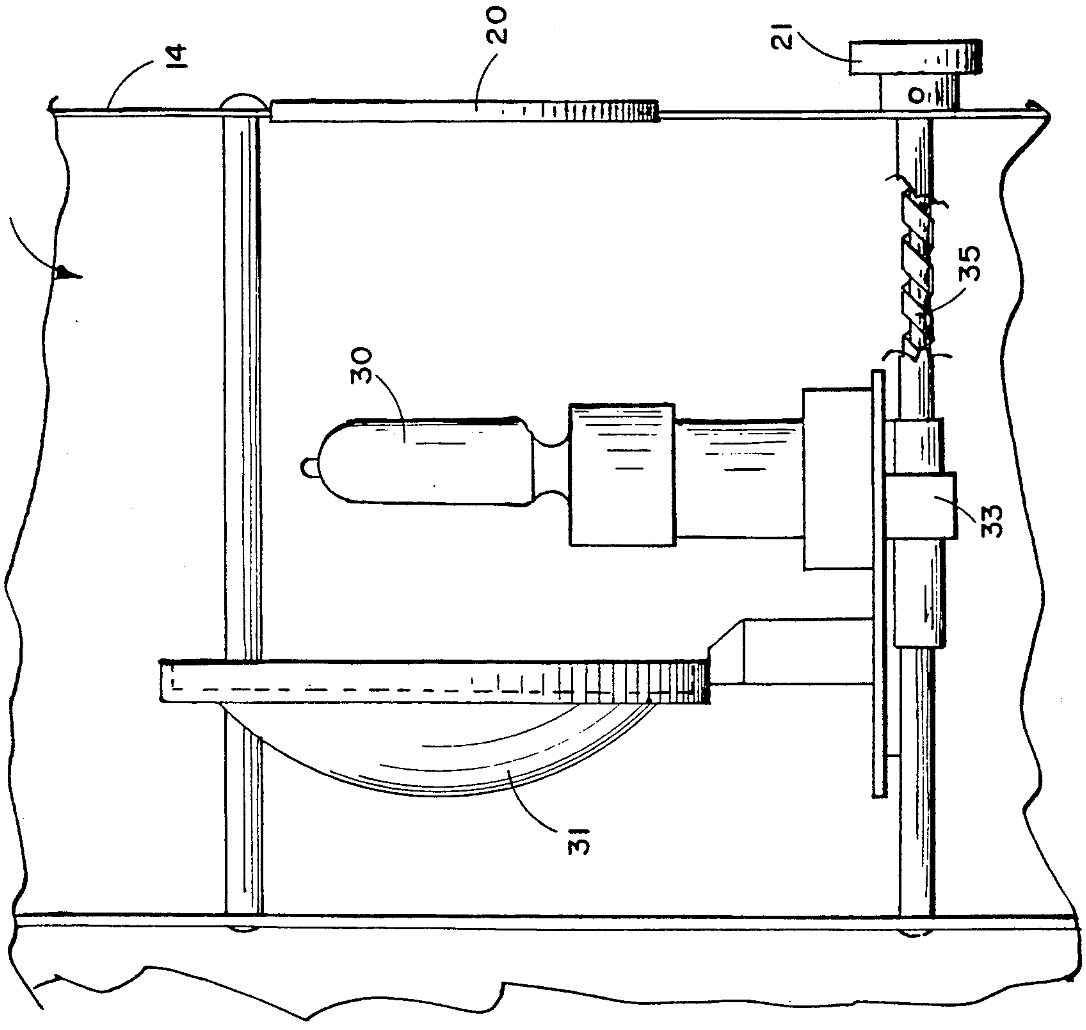
FIG. 5 is a side elevational view of the light unit of the preferred embodiment.

As shown in FIG. 2, front wall portion 14 has a glass lens 20 installed therein as well as a control knob 21 for use in focusing the light beam generated by the light unit shown in FIG.5.

Figure 6:
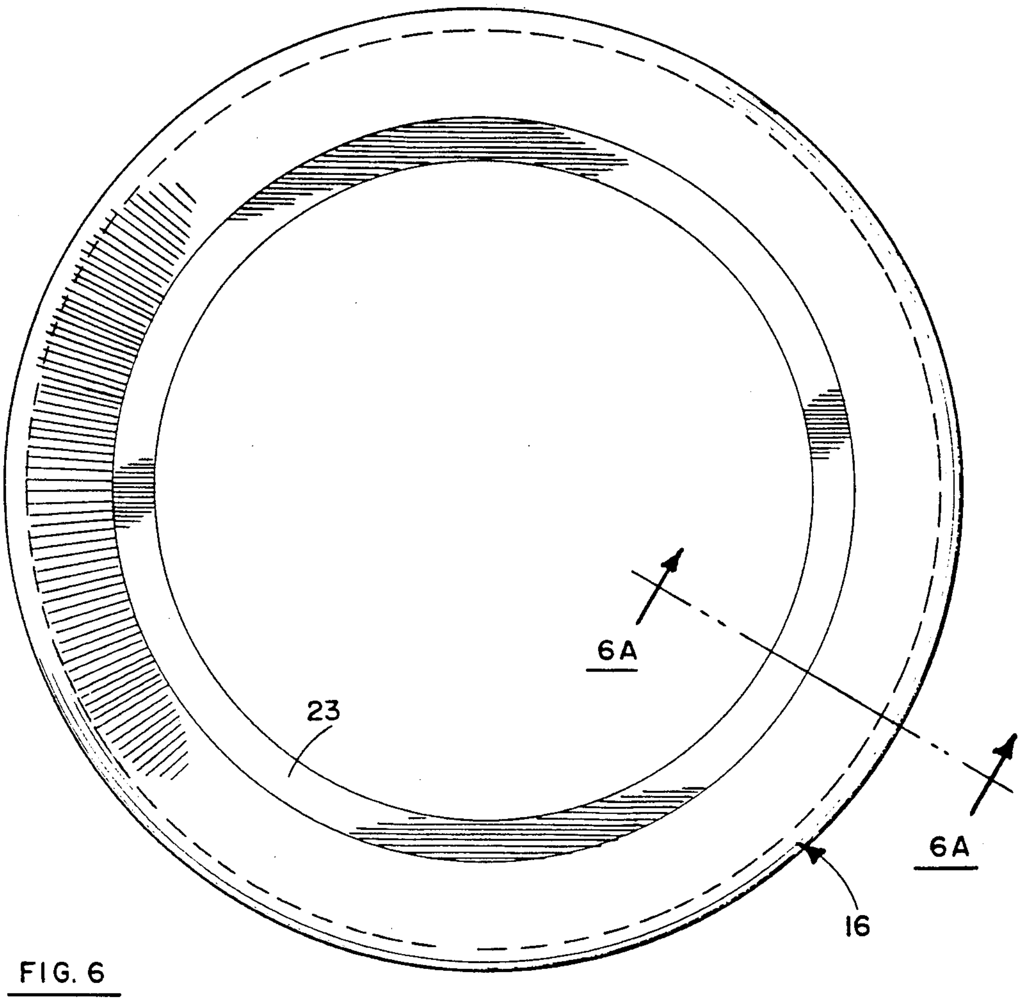
FIG. 6 is a top plan view of one of the fins of the preferred embodiment.
Figure 6A:
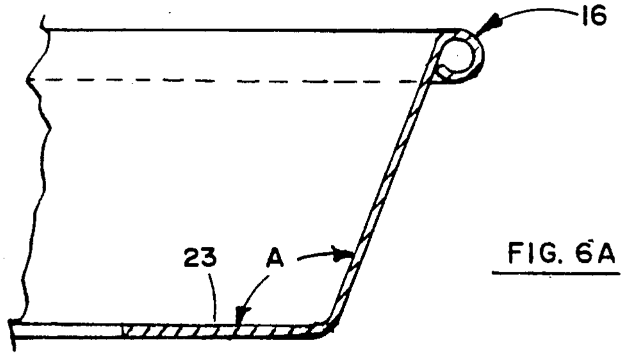
FIG. 6A is an enlarged cross-sectional view taken along the plane indicated by 6A—6A in FIG. 6.

Referring now particularly to FIGS. 4,6 and 6A, one of the fins and the fin assembly forming the side wall of the housing are illustrated. Each of the fins is in the form of an endless strip which may be fabricated as a metal spinning. The fins are conical with their inner converging ends extending towards the interior of the housing but angled away from the center of such housing. As can best be seen in FIGS.6 and 6A, extending from the inner converging end of each of the fins at an obtuse angle "A" is a flat lip 23. In the preferred embodiment angle "A" is approximately 110 degrees. Fin sections 16 are joined together to form an integral unit by means of straps 25 which are welded or otherwise attached to the lips 23 of each of the fins. Three straps(only one shown in the drawing) spaced equally around the circumference of the side wall portion of the housing may be employed.

Thus, as can be seen, a plurality of ventilation channels 17 running completely around the side wall of the housing are provided. At the same time, the angulation of the fin sections away from the center of the housing combined with the fins 23 prevents the escape of any significant amount of light through the side wall.

Referring now to FIG. 5, the light unit of the preferred embodiment is illustrated. As this unit is conventional in nature, it will be but briefly described. Globe 30 and mirror assembly 31 are supported on carriage 33. The carriage is laterally positionable relative to lens 20 to achieve focusing of the light beam by means of screw device 35 which is rotatably driven by means of focusing knob 21.

While the invention has been described and illustrated in detail, it is to be clearly understood that this is intended by way of illustration and example only and is not to be taken by way of limitation, the scope of the invention being limited only by the terms of the following claims:

I claim:

1. A light assembly comprising a housing and a light unit mounted within said housing, said housing comprising:

a plurality of fins forming the side portion of said housing, said fins being in the form of endless strips, said fins being spaced from each other to form ventilation channels running completely around said housing from the outside to the interior thereof, said fins extending towards the interior of said housing but being angled away from the center thereof so as to minimize the escape of light from said light unit through the ventilation channels, means for structurally joining said fins together to form an integral unit, a front housing end portion having a light passing portion therein for passing light emitted by said light unit therethrough, and a rear housing end portion directly opposite said front housing end portion.

2. The light assembly of claim 1 wherein said fins are conical in shape.

3. The light assembly of claim 1 wherein each of said fins sections has a lip extending from the inner end thereof at an obtuse angle to aid in blocking the passage of light through said channels.

4. The light assembly of claim 2 wherein said fins are formed from metal spinnings.

5. The light assembly of claim 1 wherein said light passing portion includes a lens installed in the front end portion of said housing.

6. The light assembly of claim 5 wherein the light unit comprises a globe with a focusing mirror behind said globe, and means for adjusting the distance between said lens and said globe and mirror to focus light emitted by said globe through said lens.

7. The light assembly of claim 1 wherein the means for structurally joining said fins together comprises at least one strap running between and attached to each of said strip sections.

8. A light assembly comprising a housing and a light unit mounted within said housing, said housing comprising:

a plurality of conically shaped fins forming the side portion of the housing, said fins being in the form of endless strips, said fins being spaced from each other to form ventilation channels therebetween, said channels running completely around the side portion of said housing from the outside to the interior of the housing, the converging inner ends of said conically shaped fins extending towards the interior of said housing but being angled away from the center thereof so as to minimize the escape of light from said light unit therethrough, each of said fins having a flat lip extending from the inner end thereof at an obtuse angle to aid in blocking the passage of light through said channels, a plurality of strap members running between and attached to each of said fins to structurally join said fins together to form an integral unit, a front housing end portion having a lens installed therein for focusing light emitted by said light unit, and a rear housing end portion directly opposite said front housing end portion, said rear housing portion being substantially opaque to light.

9. The light assembly of claim 8 wherein said lips extend from the ends of said conical fins at an angle of about 110 degrees.

* * * * *